(12) United States Patent
Spackman et al.

(10) Patent No.: US 10,611,284 B2
(45) Date of Patent: Apr. 7, 2020

(54) HEAD RESTRAINT APPARATUS FOR A VEHICLE AND METHOD

(71) Applicant: Jaguar Land Rover Limited, Whitley, Coventry, Warwickshire (GB)

(72) Inventors: Ryan Spackman, Coventry (GB); Goncalo Moedas, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 47 days.

(21) Appl. No.: 16/046,697

(22) Filed: Jul. 26, 2018

(65) Prior Publication Data
US 2019/0070991 A1 Mar. 7, 2019

(30) Foreign Application Priority Data
Sep. 1, 2017 (GB) .................................. 1714019.5

(51) Int. Cl.
*B60N 2/80* (2018.01)
*B60N 2/888* (2018.01)
*B60N 2/844* (2018.01)

(52) U.S. Cl.
CPC ............. *B60N 2/888* (2018.02); *B60N 2/844* (2018.02)

(58) Field of Classification Search
CPC ................................. B60N 2/888; B60N 2/844
See application file for complete search history.

(56) References Cited

U.S. PATENT DOCUMENTS

| | | | | | |
|---|---|---|---|---|---|
| 3,512,833 A | * | 5/1970 | Sugiura | .................. | B60N 2/818 297/410 |
| 4,679,850 A | * | 7/1987 | Bianchi | .................. | B60N 2/818 297/410 |
| 4,854,642 A | * | 8/1989 | Vidwans | ................ | B60N 2/818 297/410 |
| 6,099,077 A | * | 8/2000 | Isaacson | ................ | B60N 2/818 297/410 |
| 6,655,742 B1 | * | 12/2003 | Ozaki | .................... | B60N 2/815 297/410 |
| 6,742,846 B1 | * | 6/2004 | Isaacson | ................ | B60N 2/815 297/410 |
| 7,070,205 B2 | * | 7/2006 | Becker | .................... | B60N 2/865 280/751 |
| 7,121,626 B2 | * | 10/2006 | Akehi | .................... | B60N 2/818 297/410 |
| 7,309,108 B2 | * | 12/2007 | Tsutsui | .................. | B60N 2/818 297/410 |
| 7,364,231 B2 | * | 4/2008 | Park | ...................... | B60N 2/888 297/216.12 |

(Continued)

FOREIGN PATENT DOCUMENTS

DE 198 19 504 C1 9/1999

OTHER PUBLICATIONS

Patents Act 1977: Combined Search and Examination Report under Sections 17 and 18(3), UKIPO Application No. GB1714019.5, dated Mar. 1, 2018, 9 pp.

*Primary Examiner* — Syed A Islam
(74) *Attorney, Agent, or Firm* — Myers Bigel, P.A.

(57) ABSTRACT

A head restraint assembly is arranged to removably couple a head restraint to a vehicle seat. The head restraint assembly includes an engagement component having a retention feature configured to engage a complimentary engagement component of the vehicle seat during a deceleration event to maintain attachment of the head restraint to the vehicle seat.

16 Claims, 5 Drawing Sheets

(56) References Cited

U.S. PATENT DOCUMENTS

| | | | |
|---|---|---|---|
| 7,758,114 B2* | 7/2010 | Yokota | B60N 2/888 297/216.12 |
| 8,360,520 B2* | 1/2013 | Olsson | B60N 2/888 297/216.12 |
| 8,562,072 B2* | 10/2013 | Ishimoto | B60N 2/4228 297/216.12 |
| 8,579,370 B2* | 11/2013 | Kanda | B60N 2/4228 297/216.14 |
| 8,678,494 B2* | 3/2014 | Nitsuma | B60N 2/888 297/216.12 |
| 2003/0151290 A1 | 8/2003 | Gans et al. | |
| 2004/0113479 A1* | 6/2004 | Jost | B60N 2/838 297/391 |
| 2008/0217971 A1* | 9/2008 | Paluch | B60N 2/838 297/216.12 |
| 2010/0109397 A1* | 5/2010 | Bandurksi | B60N 2/4279 297/216.12 |
| 2014/0028072 A1 | 1/2014 | Ronzi et al. | |
| 2015/0015048 A1* | 1/2015 | Kapusky | B60N 2/844 297/408 |
| 2017/0066352 A1 | 3/2017 | Nasu | |

* cited by examiner

HEAD RESTRAINT APPARATUS FOR A VEHICLE AND METHOD

CROSS-REFERENCE TO RELATED APPLICATION

This application claims priority under 35 U.S.C. § 119 to Great Britain Application No. 1714019.5, filed Sep. 1, 2017, the content of which is incorporated herein by reference in its entirety.

RELATED APPLICATIONS

This application claims the benefit of priority to UK patent application number GB1714019.5, the entire contents of which are hereby incorporated by reference.

TECHNICAL FIELD

The present disclosure relates to a head restraint apparatus for a vehicle and method, and particularly, but not exclusively, to a removable head restraint having an arcuate mounting rod provided with a plastics material shoe on its end that fits, and is normally retained, in a metal housing. Aspects of the invention relate to a head restraint assembly, to a seat for a vehicle and to a vehicle incorporating a seat and head restraint mounted thereon. Another aspect of the present disclosure relates to a method of restraining a head restraint in position on its mounting in a vehicle seat during a deceleration event.

BACKGROUND

Head restraints are known which are removable from the backrest of the seat to enable better driver or passenger visibility. The front passenger head restraint may be electrically moveable to maximise customer comfort and also may be electrically foldable as to allow improved vision for customers seated in the rear of the vehicle, for example when being chauffeur driven. The head restraint may even be removable to further improve the visibility for the passenger seated in the rear of the vehicle.

However, with the advent of additional features optionally mountable in head restraints, such as speakers or video display equipment, or motors for electric movement, the mass of head restraints is becoming more significant. In such cases, the mounting arrangement needs to be more secure than when such options are not included, so as to avoid the head restraint from being detached as a result of a sudden deceleration of the vehicle during a crash and, rather than being a safety feature of the vehicle, instead possibly becoming a safety hazard.

A conventional mounting arrangement for a head restraint comprises a metal shoe welded on the end of each of two arcuate tubular mounting rods depending from a head restraint body. A plastic sleeve is clipped around each shoe and is adapted to fit in a metal bracket of a bracket assembly installed in a backrest of a seat of a vehicle. The sleeve acts as a cushion between the two metal components (shoe and bracket). A selectively displaceable hook retains the shoe in position, securing the shoe and sleeve, and thus the rods and head restraint, in engagement with the bracket of the bracket assembly. A manoeuvring mechanism forms a part of the bracket assembly to enable the bracket to be adjusted and hence the position or orientation of the head restraint to be altered. In one case, the bracket is rotatably mounted in the bracket assembly, whereby the head restraint can be tilted forwardly. In addition, the hook may be displaced, by selective user actuation, whereby the shoe is released from the bracket and can be withdrawn therefrom in an axial sliding "unplugging" movement, whereby the head restraint can be withdrawn and separated entirely from the seat.

The seat may have apertures in its top edge, through which the rods extend, in normal use and orientation of the vehicle and its seating, in an approximately vertical direction. The rods join with the head restraint body above the top edge of the seat. Below the top edge of the seat, after passing through the apertures, the rods may be arranged in an arc, centred on the centre of rotation of the bracket. The shoes of the rods plug into the bracket by movement therebetween in an approximately horizontal direction, the arc of the rods being approximately a quarter of a circle. When in a first configuration of the head restraint, the rods extend approximately vertically out of the top edge of the seat back rest and the body of the head restraint is above that back rest in a normal position to support and protect a passenger's head and neck when seated in the seat.

When the bracket is rotated by actuation of a motor or other means, the arced section of the rods progressively exit the apertures, tilting the head restraint body forwardly of the seat into a second configuration, lowering its top edge. In moving to this second configuration, the shoes of the rods may be withdrawn from the bracket in an approximately vertical direction, through the apertures, once the bracket has been rotated through approximately ninety degrees, and once the hook, or other mechanism retaining the shoes in place in the bracket, has been released by the user.

Throughout this specification the description of components, parts or assemblies being approximately vertical, approximately orthogonal or approximately horizontal is not intended to be unduly limiting but are employed simply to indicate to the reader relative positions, in general terms, of those components, parts or assemblies. The precise geometry of the parts so described is a matter of design choice.

Thus, in normal use of the head restraint, the shoes and sleeves are approximately horizontally disposed in the bracket, with the rods extending approximately vertically out of the seat apertures. Should the vehicle in which the seat and head restraint are fitted be travelling at speed and be involved in a frontal (or rearward) collision, and decelerate (or accelerate) violently in a forward (or rearward) direction of the vehicle, the head restraint will apply a load on the shoes in the bracket. Should the head restraint be heavy (for example as a result of additional features such as speakers or video display equipment being mounted thereon), the load applied may be sufficient to snap and crush the plastics sleeve between the shoe and bracket and permit an unintended degree of freedom of movement between the shoe and bracket. Such unintended freedom of movement between the shoe and bracket can result in the hook or other means normally restraining the shoe in place becoming dislodged and permitting the shoe to separate from the bracket, potentially resulting in the headrest separating from the seat and becoming a projectile within the vehicle.

It is an object of embodiments of the invention to at least mitigate one or more of the problems of the prior art.

SUMMARY OF THE INVENTION

Aspects and embodiments of the invention provide a head restraint assembly for a vehicle, a seat incorporating a head restraint and a head restraint assembly mounted thereon, a vehicle incorporating such seat, and a method of restraining release of a head restraint from a bracket assembly in the event of a deceleration event, as claimed in the appended claims.

The invention provides a head restraint assembly, wherein the head restraint assembly is arranged to removably couple a head restraint to a vehicle seat, wherein the head restraint assembly comprises an engagement component having retention means configured to engage a complimentary engagement component of the vehicle seat during a deceleration event to maintain attachment of the head restraint to the vehicle seat.

Advantageously the engagement component enables head restraints with a higher mass to maintain attachment to the vehicle seat. The higher mass head restraints may include, for example, motors or speakers that increase the mass of the head restraint. Furthermore, the engagement component is disengaged in normal use thus allowing a user of the vehicle to remove the head restraint from the vehicle seat if desired.

In an embodiment of the invention, the engagement component may comprise a shoe arranged to be coupled to the head restraint and releasably received within a bracket of the vehicle seat.

In one embodiment of the invention, the shoe may comprise a retention means comprising a hook feature arranged to engage with the complimentary engagement component of the bracket.

In a further embodiment of the invention, the shoe may be arranged to be coupled to an end of a mounting rod of the head restraint. In an embodiment of the invention the shoe may be made from metal.

In another embodiment of the invention, the head restraint assembly comprises a plastic sleeve disposed, in use, between the shoe and a bracket of the vehicle seat. In an embodiment of the invention the plastics sleeve may be retained on the shoe by a tab of the shoe engaging with an aperture within the plastics sleeve.

In an embodiment of the invention, the retention means of the shoe may be arranged to engage with the complimentary engagement component of the vehicle seat to maintain attachment of the head restraint to the vehicle seat when the plastics sleeve fails during the deceleration event.

In another embodiment of the invention the bracket may be arranged to be adjustable in a bracket assembly, whereby movement is enabled of the head restraint between a first configuration and a second configuration of the head restraint with respect to a seat in which the bracket assembly is disposed.

In an embodiment of the invention the bracket may be rotatably mounted in the bracket assembly about a rotation axis, adopting a first attitude in said first configuration having a first axial direction and an approximately orthogonal attitude in said second configuration, said rod being arcuately shaped between its end engaging said bracket and its connection with a body of the head restraint.

In a further embodiment of the invention, the bracket assembly may comprise a selectively releasable catch to permit disengagement of the head restraint from the bracket assembly. In one embodiment of the invention the catch may be a hook in the bracket assembly adapted to engage an edge of the shoe and prevent, when engaged therewith, movement of the rod and shoe in said first axial direction to release the head restraint from the bracket assembly.

According to another aspect of the invention there is provided a seat for a vehicle, in which is mounted a head restraint and a head restraint assembly according to embodiments of the invention, wherein the head restraint assembly is mounted in a back rest of the seat and the head restraint is mounted above a top surface of the back rest when the seat is disposed in position for use.

In one embodiment of the invention, in the first configuration of the head restraint, the head restraint body is above said top surface, the rod passing through an aperture in said top surface, and in said second configuration, the head restrain body is forward of the back rest relative to the first configuration, having rotated about the rotation axis of the bracket, whereby, on release of the hook, the shoe on the end of the rod is withdrawable from the bracket in said first direction and through the aperture.

According to another aspect of the invention there is provided a vehicle incorporating a seat in accordance with embodiments of the invention.

In an embodiment of the invention the head restraint body may have two rods, each mounted in a respective bracket of the bracket assembly. In one embodiment of the invention, each bracket may have a respective associated hook feature.

According to an aspect of the invention there is provided a method of restraining a head restraint mounted in a bracket assembly of a vehicle seat wherein a deceleration event causes a retention means to retain the head restraint in position, the retention means being disengaged until said deceleration event occurs.

In one embodiment of the invention, the head restraint may move with respect to the bracket assembly during said deceleration event to engage said retention means.

In another embodiment of the invention the head restraint may comprise a head restraint body mounted on a rod having a shoe on its end that engages in, and is retained in, a bracket of the bracket assembly, wherein a plastics sleeve is disposed between the bracket and shoe, and wherein said movement occurs through the plastics sleeve failing during the deceleration event. In one embodiment of the invention, the plastic sleeve is clipped to and forms a part of the shoe.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
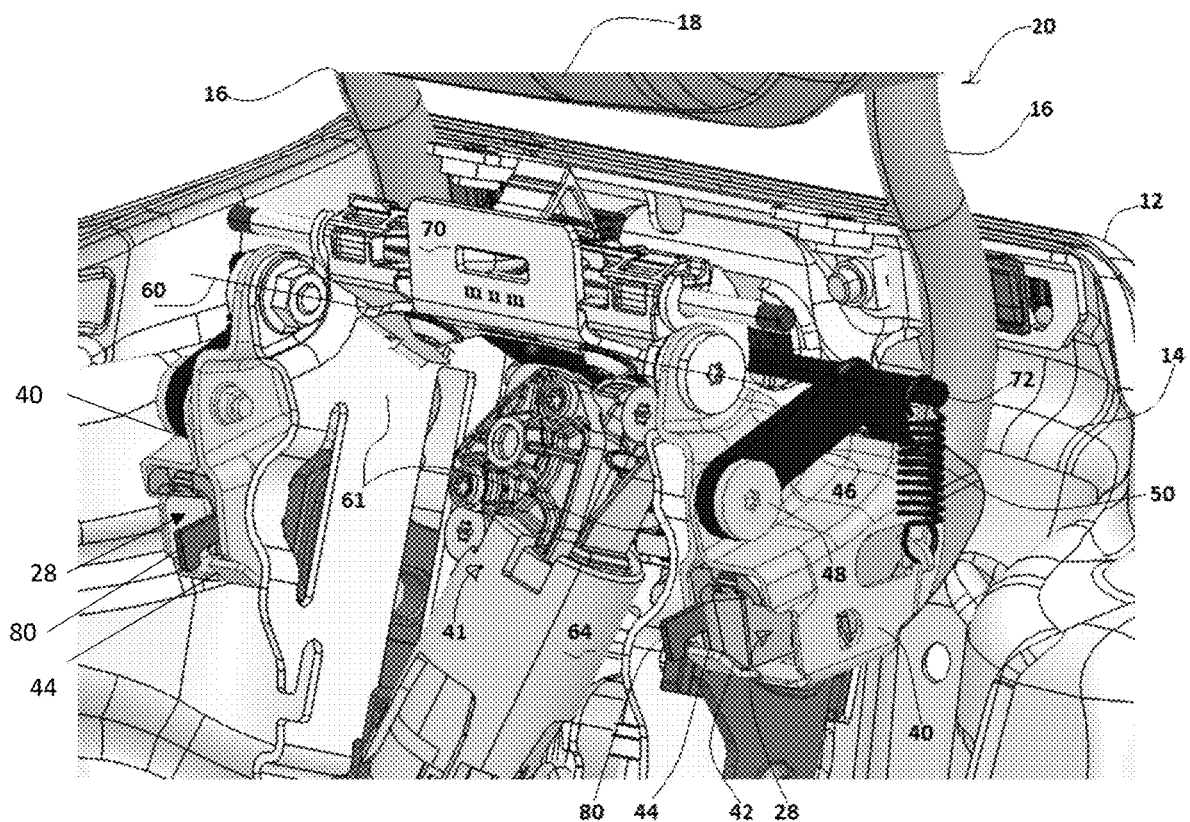
FIG. 1 shows a perspective cut-away view of a bracket assembly and head restraint mounted in a backrest of a vehicle seat.

In FIG. 1, a vehicle seat 12 has a backrest shell 14 that is shown cut-away. Two hollow tubular mounting rods 16 extend through apertures (not visible, but schematically shown at 17 in FIG. 2) in a top surface (also not visible) of the backrest. Each rod 16 is fixed in a head restraint body 18 (only partially shown in FIG. 1), the rods 16 and head restraint body 18 together defining a headrest or head restraint 20.

Figure 2:
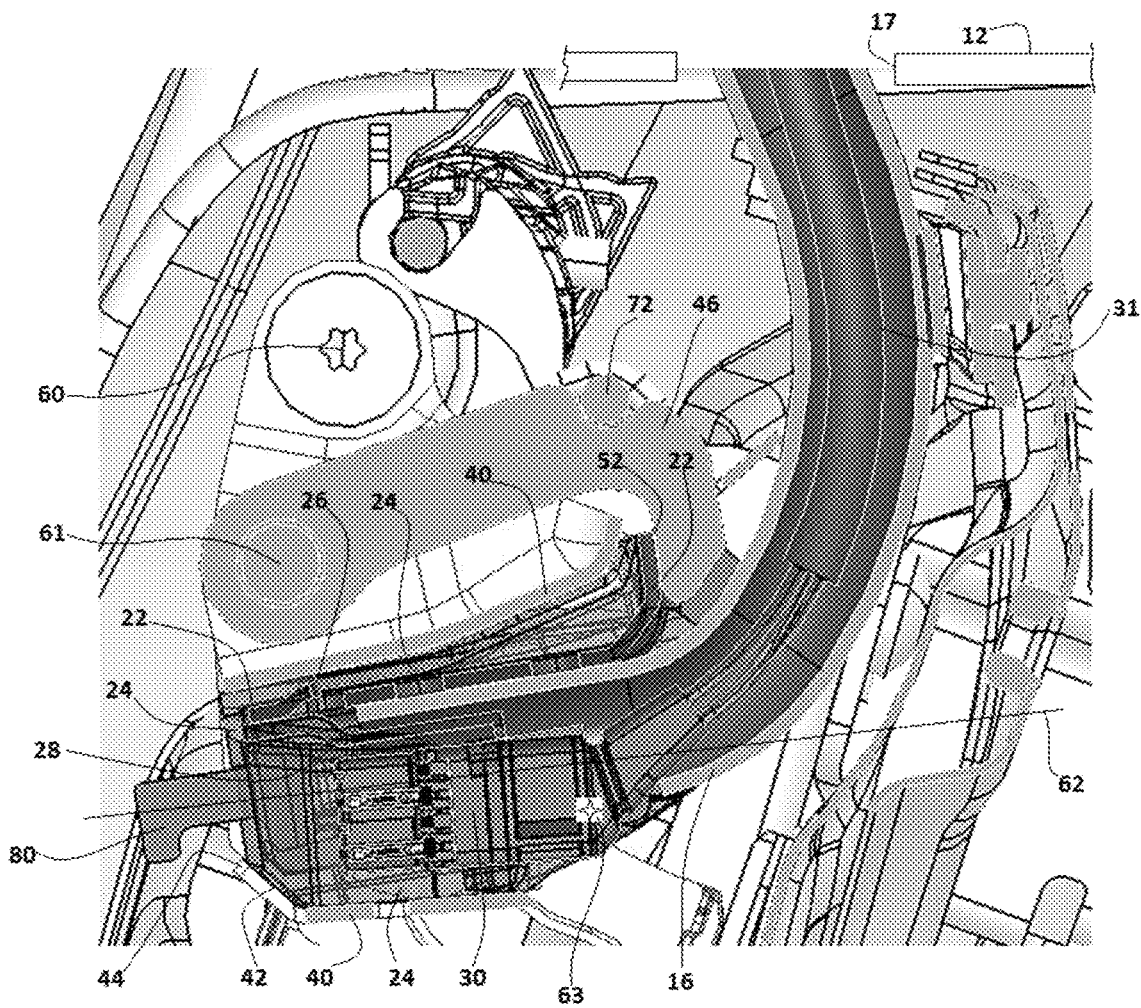
FIG. 2 shows detail of a bracket mounting a head restraint.
Figure 4:
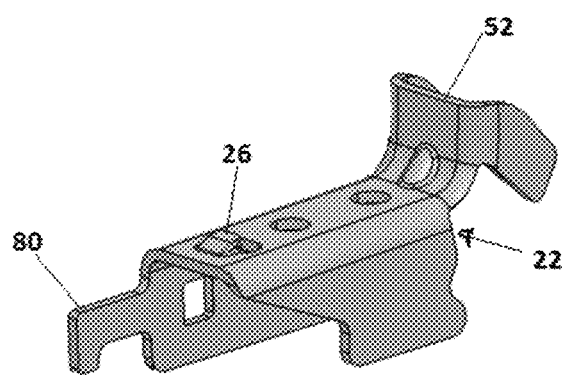
FIG. 4 shows a shoe incorporating retention means.

Referring also to FIG. 2, to the end of each rod 16 there is coupled, for example by welding, an engagement component or shoe 22, visible in detail in FIG. 4. In an embodiment of the invention each shoe 22 and respective rod 16 may be manufactured out of a single part. Over each shoe 22 is clipped, or otherwise provided, a plastics material sleeve 24, retained on the shoe 22 by a tab 26 of the shoe engaging with an aperture within the plastics sleeve 24. The sleeve 24 extends over the external surface of the shoe 22 and for the example illustrated in FIG. 2 also protrudes internally of the shoe 22 to define a socket 28 and a support for a wiring connection 30 to provide electrical service on cable 31, through the respective rod 16, to equipment (not shown) mounted in the head restraint body 18. The socket 28 receives a wiring plug (not shown) to deliver the service to the equipment.

Each shoe 22 is a close fit in the respective sleeve 24. The sleeve 24 is a close fit in a bracket 40, being a part of bracket assembly 41, described further below. When the sleeve 24 is inserted in the bracket 40 (as shown in FIG. 1) an end 42 of the sleeve abuts a complimentary engagement component or stop 44 of the bracket 40. A selectively releasable catch or hook 46 is pivotally mounted on the bracket 40, around stud 48, and retained in a latch position by a spring 50 connected to the bracket 40. The hook 46 engages a back edge 52 of the shoe 22 and holds it, and the sleeve 24, in engagement with the bracket 40. While the sleeve 24 is shown and described herein as clipped to the shoe 22 and forms a part of the head restraint 20, it could in other embodiments be a component of the bracket 40, instead of, or additionally as, a component of the head restraint 20.

As mentioned above, each bracket 40 is part of the bracket assembly 41, which is known and therefore does not require detailed description herein. The assembly 41 illustrated in FIG. 1 comprises two brackets 40, each pivoted about the same axis 60 to a frame 61 of the bracket assembly. By means (not shown) the brackets 40 are retained in the same pivot position with respect to each other, about axis 60, such that the brackets 40 remain parallel with respect to each other.

In a first configuration of the head restraint 20, as shown in FIG. 2, the brackets 40 are oriented so that an insertion axis or direction 62 for the shoe/sleeve combination 22/24 is approximately horizontal (if the vehicle, in which the seat in which the bracket assembly is fitted, is on horizontal ground). However, a motor 64, or other means, is arranged, when activated, to rotate the brackets 40 through as much as approximately 90°, anticlockwise in the views of FIGS. 1 and 2. This turns the insertion axis 62 likewise through (approximately) 90°, rotating the brackets 40 towards the apertures 17 in the top surface 12 of the seat back rest 14.

Figure 3:
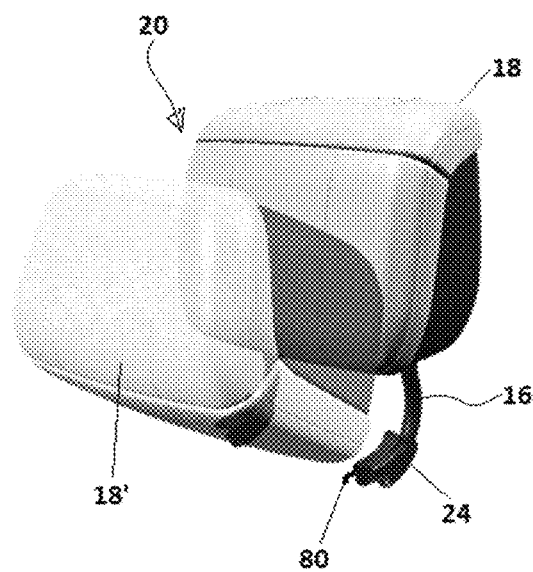
FIG. 3 shows a head restraint, in two configurations.

It is to be noted that the rods 16 are arcuate, with a radius of curvature centred on the axis 60, whereby rotation of the brackets 40 feeds the rods 16 through the apertures 17, tilting the head restraint body 18 forwardly and downwardly, (as shown at 18' in FIG. 3), to a second configuration. In this configuration, if a lever 70 is actuated by the user, bar 72 is lifted (forwardly, when the head restraint 20 is in its second configuration), against the restoring bias of springs 50, to release the hook 46 from engagement with the edge 52 of the shoe 22.

With the brackets 40 being in their pivoted second configuration, and on release of the hook 46 from the shoe 22, withdrawal of the shoe/sleeve combination 22/24 from each bracket 40, by movement along the direction 62, leads to separation of the head restraint 20 from the bracket assembly 41 and also direct retraction through the apertures 17 of the shoe/sleeve combination 22/24.

With this arrangement alone, however, it is possible that with a relatively large deceleration event, for example, of 35G or more, over a period exceeding 110 ms, and given the potential mass of the head restraint body 18 when it includes additional functional items, it is feasible for the plastic sleeves 24 to experience sufficiently high forces that cause them to shatter, resulting in significant free play between the shoes 22 and the brackets 40. That free play may ultimately result in the release of the hook 46 from the shoe back edge 52, and thus of the shoe 22 from the bracket 40. This risks freeing the head restraint 20 entirely from the seat 12 in which it is disposed. This risk is not necessarily realised immediately upon the deceleration event occurring, but could be in moments following the deceleration event, through oscillation of the different components involved.

Thus retention means are provided to retain the head restraint 20 in position, even in the event of a relatively large deceleration event, for example one exceeding 35G over a period greater than 110 ms, although lesser or different deceleration events could still invoke application of the retention means. In one embodiment, the retention means may comprise a crash hook 80 formed as part of each shoe 22. In normal use, the crash hook 80 does not impede movement of the shoe 22 in the axial direction 62, which is the direction of release of the shoe 22 from the bracket 40 in normal use. That movement is restricted only by the selectively engageable hook 46 (or whatever means of normal retention is employed in different embodiments).

However, in the event of the rods 16 pivoting with respect to the bracket 40, about some axis at or near the position shown in FIG. 2 at 63, which would depend among other things on the collapse of the plastics sleeve 24 during such a deceleration event (or afterwards), the crash hook 80 engages the complimentary engagement means or stop 44 of the bracket 40 and prevents escape of the shoe 22 from the bracket 40. The shoe 22 and bracket 40 are made from a metal such as steel. As such, the shoe 22 and bracket 40 are not susceptible to failure during a deceleration event in the same manner as the plastics sleeve 24. This also serves to retain the headrest 20 and prevent it from becoming detached from the seat. As mentioned above, the crash hook 80 does not engage the stop 44 in normal use which advantageously facilitates the removal of the head restraint 20 by the user. That is to say, with the plastic sleeve 24 intact (as it is in normal use), the crash hook 80 cannot, and does not, engage the stop 44, enabling withdrawal of the shoe 22, plastic sleeve 24 and rod 16 (on which they are mounted) from the bracket 40 in the axial direction 62. This is of course desirable in normal use to allow removal of the head restraint 20, when desired.

In a different embodiment, however, it would be feasible to arrange that the crash hook 80 does engage the stop 44 during movement in the axial direction 62, (by small modification of either the crash hook 80 or stop 44 from that shown in the drawings), whereby accidental release of the head restraint 20 may be prevented. Instead, some manipulation of the head restraint 20 is required to disengage the crash hook 80 from the stop 44. That manipulation would comprise essentially some pivoting of the head restraint 20 around the axis 63 or thereabouts once the shoe/sleeve had cleared the bracket 40 enough to permit such pivoting movement. This embodiment is not illustrated in the drawings.

In a still further embodiment, it may be arranged that the crash hook 80 prevents such complete release of the head restraint 20, in the case where it is not desired that the head restraint 20 be removable from the seat 12. This can again be arranged by minimal adjustment of the components. However, to enable initial insertion and assembly of the seat 12 and head restraint 20, it may be required to arrange for the crash hook 80 or stop 44 to be capable of deflection on first insertion of head restraint 20 and snap into a position where subsequent removal is not possible. This embodiment is not illustrated in the drawings.

In any event, the crash hook 80 may be such that it engages the stop 44 even without the plastics sleeve 24 shattering during a deceleration event. This would be the case, in any event, if the two alternative embodiments just described were employed. But, even in the case of the embodiment first described and illustrated in the drawings, the crash hook 80 may engage the stop 44 either with mere deformation of the plastics sleeve 24, or even with no deformation at all. The latter could occur, for example, if the retention hook 46 becomes disengaged in a deceleration event, other than through breakage of the plastics sleeve 24. That would then permit non-axial movement of the shoe/sleeve and may be enough to ensure that the crash hook 80 engages.

Of course, under normal circumstances, even in the case of collision resulting in a significant deceleration event, the plastics sleeve 24 does not deform or break, and the release hook 46 does not disengage from the edge 52 of the shoe 22 and the head restraint 20 is retained in position. However, there may be times when it is not an initial deceleration event that causes dislodgement of the shoe 22 and sleeve 24 in the bracket 40, and release of the hook 46 from the edge 52. Instead, oscillations of the system after such an event may be sufficient cause to engage the crash hook 80 and bring it into play in retraining the head rest 20 from being released.

Thus, embodiments of the present invention provide a simple modification to a conventional head-restraint mounting bracket assembly 41 that enables a more massive head restraint body 18 to be employed, whilst maintaining existing safety standards as regards secure attachment of the head restraint 20 during deceleration events. It is to be borne in mind that, while the embodiments described above have been described primarily with reference to "deceleration" events, which generally result from relatively high speed forward motion of the vehicle 100 being arrested suddenly through a frontal impact, the term "deceleration event" as used herein should not be interpreted to exclude a sudden acceleration of the vehicle in the forwards direction through an impact to the rear of the vehicle 100. Such accelerations may have equal effect in causing release of the head restraint (either on the initial acceleration or in subsequent oscillations) and engagement of the retention means. Furthermore, a sudden acceleration of the vehicle in a forwards direction will typically be followed by further deceleration event, as the vehicle will decelerate as it comes back to rest after the acceleration caused by the impact to the rear of the vehicle.

It is to be noted that each shoe 22 has a respective crash hook 80 associated with each bracket 40 (only one side of the bracket assembly 41 being referenced in detail in the drawings). This maintains balance, but is not necessarily essential and an alternative arrangement may have a single crash hook on just one of the shoes 22.

Figure 5:
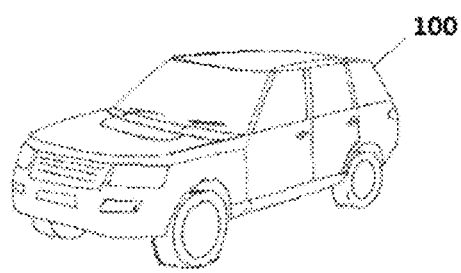
FIG. 5 shows a vehicle.

FIG. 5 illustrates a vehicle 100 in which a seat as described above may be installed.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A head restraint assembly arranged to removably couple a head restraint to a vehicle seat, wherein the head restraint assembly comprises:
   an engagement component having a retention feature configured to engage a complimentary engagement component of the vehicle seat during a deceleration event to maintain attachment of the head restraint to the vehicle seat, wherein the engagement component is disengaged in normal use, thereby allowing a user of the vehicle to remove the head restraint from the vehicle seat, wherein the engagement component comprises a shoe arranged to be coupled to the head restraint and releasably received within a bracket of the vehicle seat, wherein the shoe comprises a hook feature arranged to engage with the complimentary engagement component; and
   a plastic sleeve disposed, in use, between the shoe and a bracket of the vehicle seat.

2. The head restraint assembly as claimed in claim 1, wherein the shoe is arranged to be coupled to an end of a mounting rod of the head restraint.

3. The head restraint assembly as claimed in claim 1, wherein the shoe is made from metal.

4. The head restraint assembly as claimed in claim 1, wherein the plastic sleeve is retained on the shoe by a tab of the shoe engaging with an aperture within the plastic sleeve.

5. The head restraint assembly as claimed in claim 1, wherein the hook feature is arranged to engage with the complimentary engagement component of the vehicle seat to maintain attachment of the head restraint to the vehicle seat when the plastic sleeve fails during the deceleration event.

6. The head restraint assembly as claimed in claim 1, wherein the bracket is arranged to be adjustable in a bracket assembly, whereby movement is enabled of the head restraint between a first configuration and a second configuration of the head restraint with respect to a seat in which the bracket assembly is disposed.

7. The head restraint assembly as claimed in claim 6, wherein the bracket is rotatably mounted in the bracket assembly about a rotation axis, adopting a first attitude in the first configuration having a first axial direction and an approximately orthogonal attitude in the second configuration, wherein a rod is arcuately shaped between its end engaging the bracket and its connection with a body of the head restraint.

8. The head restraint assembly as claimed in claim 6, wherein the bracket assembly comprises a selectively releasable catch to permit disengagement of the head restraint from the bracket assembly.

9. The head restraint assembly as claimed in claim 8,
wherein the bracket is rotatably mounted in the bracket assembly about a rotation axis, adopting a first attitude in the first configuration having a first axial direction and an approximately orthogonal attitude in the second configuration, wherein a rod is arcuately shaped between its end engaging the bracket and its connection with a body of the head restraint,
wherein the catch is a hook in the bracket assembly adapted to engage an edge of the shoe and prevent, when engaged therewith, movement of the rod and shoe in the first axial direction to release the head restraint from the bracket assembly.

10. A seat for a vehicle, in which is mounted the head restraint and the head restraint assembly as claimed in claim 1, wherein the head restraint assembly is mounted in a back rest of the seat and the head restraint is mounted above a top surface of the back rest when the seat is disposed in position for use.

11. A vehicle incorporating a seat as claimed in claim 10.

12. The head restraint assembly as claimed in claim 2, wherein the head restraint body has two rods, each mounted in a respective bracket of the bracket assembly.

13. The head restraint assembly as claimed in claim 12, wherein each bracket has a respective associated hook feature.

14. A method of restraining a head restraint mounted in a bracket assembly of a vehicle seat, wherein a deceleration event causes a retention feature to retain the head restraint in position, wherein the retention feature is disengaged until the deceleration event occurs, wherein the head restraint comprises a head restraint body mounted on a rod having a shoe on its end that engages in, and is retained in, a bracket of the bracket assembly, wherein a plastic sleeve is disposed between the bracket and shoe, and wherein movement of the head restraint occurs through the plastic sleeve failing during the deceleration event.

15. The method as claimed in claim 14, in which the head restraint moves with respect to the bracket assembly during the deceleration event to engage the retention feature.

16. The method as claimed in claim 14, wherein the plastic sleeve is clipped to and forms a part of the shoe.

* * * * *